(12) United States Patent
Schumacher et al.

(10) Patent No.: US 7,927,021 B2
(45) Date of Patent: Apr. 19, 2011

(54) SECURING DEVICE FOR A BEARING RING IN A HOUSING

(75) Inventors: Kay Schumacher, Gochsheim (DE); Benno Fueller, Karlstadt (DE); Georg Schoener, Poppenhausen (DE)

(73) Assignee: Schaeffler KG, Herzogenaurach (DE)

( * ) Notice: Subject to any disclaimer, the term of this patent is extended or adjusted under 35 U.S.C. 154(b) by 494 days.

(21) Appl. No.: 12/063,906

(22) PCT Filed: Aug. 2, 2006

(86) PCT No.: PCT/DE2006/001347
§ 371 (c)(1),
(2), (4) Date: May 19, 2008

(87) PCT Pub. No.: WO2007/022748
PCT Pub. Date: Mar. 1, 2007

(65) Prior Publication Data
US 2008/0279495 A1 Nov. 13, 2008

(30) Foreign Application Priority Data
Aug. 19, 2005 (DE) .......................... 10 2005 039 259

(51) Int. Cl.
*F16C 35/06* (2006.01)
(52) U.S. Cl. ..................... 384/537; 384/539; 384/903

(58) Field of Classification Search .................. 384/537, 384/539, 903, 544; 403/368, 371, 372; 411/517–521; 267/158–165
See application file for complete search history.

(56) References Cited

U.S. PATENT DOCUMENTS

| | | | | |
|---|---|---|---|---|
| 3,075,779 A | * | 1/1963 | Holdham et al. | 277/551 |
| 4,543,988 A | * | 10/1985 | Huveteau | 411/521 |
| 4,710,037 A | * | 12/1987 | Newberg | 384/537 |
| 5,709,283 A | * | 1/1998 | Nief | 180/428 |
| 5,927,867 A | * | 7/1999 | Niebling et al. | 384/539 |
| 6,227,785 B1 | * | 5/2001 | Kilgore | 411/526 |
| 6,705,763 B2 | * | 3/2004 | Kamura et al. | 384/544 |
| 7,374,345 B2 | * | 5/2008 | Ilie et al. | 384/537 |
| 2003/0099419 A1 | | 5/2003 | Vignotto et al. | |

FOREIGN PATENT DOCUMENTS

| | | |
|---|---|---|
| DE | 19713333 A | 1/2000 |
| EP | 0678683 A | 10/1995 |
| GB | 2010986 A | 7/1979 |

* cited by examiner

*Primary Examiner* — Thomas R Hannon
(74) *Attorney, Agent, or Firm* — Lucas & Mercanti, LLP

(57) ABSTRACT

The invention relates to a securing device for a bearing ring in a housing. At least one spring element engages in an annular groove of the housing and at least one angled collar supports the bearing ring in an axial manner. The spring element is hook-shaped and forms an angle that extends in a radial manner towards the outside and at least partially back in the axial direction. At least one push element is formed on the securing device, which is actively connected to the spring element in such a manner that the spring element is pre-stressed in an axial manner, by actuating the push element.

11 Claims, 3 Drawing Sheets

SECURING DEVICE FOR A BEARING RING IN A HOUSING

FIELD OF THE INVENTION

The invention relates to a fastening device for a bearing ring in a housing.

This fastening device has an essentially annular or hollow-cylindrical basic body with at least one spring element, which engages into an annular groove of the housing, and with at least one angled shoulder, on which the bearing ring can be supported axially.

The fastening device is in this case essentially seated with its basic body on the outside of the bearing ring and holds or secures the latter, at least in the axial direction, in the housing via the at least one spring element and the at least one angled shoulder.

BACKGROUND OF THE INVENTION

A fastening device of this type, a securing sleeve or securing ring, is described in DE 197 13 333 C2.

The outer ring of a wheel bearing is secured axially in a housing by means of this securing sleeve or securing ring.

The securing ring, in this case made from sheet metal, has a mostly hollow-cylindrically designed basic body, with which the securing ring is seated radially on the outside of the bearing outer ring, also referred to briefly as a bearing ring.

Spring elements project from the basic body of the securing ring. The spring elements are spread radially outward obliquely from the securing ring, with respect to an axis of rotation of the bearing outer ring or of the wheel bearing, and engage or latch into an annular groove of the housing. The annular groove is formed in a bore of the housing and is open radially inward.

A mostly disk-shaped shoulder projects radially from the basic body of the securing ring in the direction of the axis of rotation. The shoulder is angled from the basic body and engages behind the bearing outer ring on one end face such that the bearing outer ring is supported in one axial direction on the shoulder of the securing ring.

In the securing ring of the prior art described, the spring elements are stamped out from the basic body and are spread radially outward obliquely.

This gives rise to cuttings from the basic body of the securing ring which weaken the latter.

The securing of the bearing ring of the bearing in the housing by means of this securing ring is therefore often not executed with sufficient rigidity, and therefore the bearing outer ring creeps axially in the housing, albeit within a limited amount.

During installation, the securing ring is first pressed firmly onto the bearing outer ring. When the bearing outer ring is being introduced in the process into the housing, an obliquely outward-facing side of the spring elements of the securing ring impinges onto an edge at the margin of the bearing seat.

As a result of contact with the edge, each of the spring elements springs elastically in the direction of the cuttings or springs into the respective cuttings until the bearing outer ring can be introduced, together with the securing ring, into the housing.

When the bearing ring is in its final position, the spring elements spring open elastically and latch into the annular groove.

In fastenings or in fastening arrangements with such securing rings from the prior art, all tolerances which may have an influence on the position (desired position) of the spring elements of the securing ring with respect to the annular groove must be taken into account in the design of the dimensions of the annular groove on the housing so that the spring elements can always spring open freely from the desired position into the annular groove within the limits of permissible deviations.

As a rule, therefore, the spring elements engage with relatively high axial play into the annular groove and are not supported or are not supported free of play, in the groove.

The bearing outer ring, and consequently also the bearing per se, may creep axially in the housing within this play under load, that is to say under radial and/or axial or under static and/or dynamic load, and after lengthy operation.

The axial creep of the bearing ring or of the bearing is a disadvantage for the service life of the bearings, is accompanied, as a rule, by disturbing clicking noises and has an adverse effect on the accuracy of measurement signals from measurement sensors arranged on the bearing.

SUMMARY OF THE INVENTION

The object of the invention, therefore, is to provide a fastening device, by means of which the above-mentioned disadvantages are avoided. In particular, by virtue of the invention, the axial movement of a bearing ring or of a bearing in the housing under dynamic and/or static load is to be prevented or at least largely restricted.

This object is achieved by means of the fastening device having the features according to the independent claim. Preferred developments of the invention may be gathered from the dependent claims.

The fastening device according to the invention for a bearing ring, in particular a wheel bearing, in a housing has an essentially hollow-cylindrical basic body, in particular capable of being seated or of being placed radially on the outside of the bearing ring, with at least one spring element for engagement into an annular groove of the housing and with at least one angled shoulder capable of supporting the bearing ring axially.

The at least one spring element is designed to be angled in hook form from the basic body radially outward and at least partially back into the axial direction. Further, the fastening device has integrally formed on it at least one push element, for example a push shackle, which is operatively connected to the at least one spring element in such a way that, by the at least one push element being actuated, the at least one spring element can be prestressed and/or braced, in particular axially.

Contrary to the prior art described, the at least one spring element is not stamped out from the basic body and set outward, but, instead, during production, is folded over out of an axial prolongation of the basic body radially outward.

By virtue of the additional at least one push element operatively connected to the at least one spring element or by virtue of the actuations of said push element when the bearing is being pressed into the housing, the at least one spring element can be prestressed axially when the bearing is pressed in—the fastening device, for example a securing ring, is in this case seated on the bearing ring—and can latch into the annular groove provided for this purpose in the housing.

On account of the axial springing of the at least one spring element by means of the actuation of the at least one push element, a greater spring excursion than in conventional cup springs can be implemented, with the result that a bridging of a gap occurring due to component tolerances, particularly between the fastening device and the housing groove, can be achieved.

Correspondingly to the at least one spring element, the at least one push element may likewise be designed to be angled in hook form from the basic body radially outward and at least partially back into the axial direction.

When the at least one push element is actuated, it can then be loadable essentially axially preferably in an end region, in particular on an end face, of the region angled axially back.

For this purpose, for example, a conventional assembly tool, known in the prior art, for pressing a bearing into the housing may be used. On this assembly tool, only one additional groove of small depth needs to be provided, at the contact surface with the at least one push element, in order to prevent the push element from slipping off or flapping off during the pressing-in operation.

After the assembly tool has been moved away and at the same time after a "detensioning" of the fastening device, the at least one spring element is brought to bear against a boundary surface, for example a ramp, of the housing groove, with greater or lesser axial prestress, depending on the tolerance situation.

Also, a possibly occurring plastic radially inward deformation of the at least one spring element as a result of pressing into the housing, which deformation may influence the seat of the spring element in the housing, can be at least partially cancelled again by the spring element being subsequently pressed by means of the at least one push element at the end of the pressing-in operation.

Furthermore, there may be provision for the at least one push element and the at least one spring element to be operatively connected to one another in such a way that, in the case of axial load on the end region of the axially angled-back region of the at least one push element, the at least one spring element can be prestressed and/or braced in the annular groove elastically against the housing.

Also, there may be provision for the at least one push element and for the at least one spring element to be operatively connected to one another in such a way that, in the case of axial load on the end region of the axially angled-back region of the at least one push element, that region of the at least one spring element which is at least partially angled back into the axial direction can be spread radially away from the basic body.

Particularly preferably, the at least one spring element is formed from at least one, in particular essentially radially resilient, spring collar integrally formed in one piece on the basic body, the spring collar being overturned to form a first bend radius, such that the spring collar projects at least partially beyond the basic body axially.

Likewise particularly preferably, the at least one push element may be formed from an, in particular, essentially axially resilient push collar, in particular integrally formed in one piece on the basic body, the push collar being overturned to form a second bend radius, such that the push collar projects at least partially, in particular altogether, beyond the basic body axially.

For stiffening the at least one push element, the push collar of the latter may have a V-shaped design in the axial direction.

Furthermore, preferably, there may be provision for the push collar of the at least one push element to project beyond the basic body axially by the amount of a predetermineable projecting length and/or to project beyond an axial end face of the fastening device by the amount of a predetermineable projecting length.

The projecting length may in this case be designed as a function of a gap or of a size of a gap between the fastening device on the annular groove of the housing, in particular the projecting length being designed to be greater than the gap.

In other words, the projecting length of the push element with respect to the end face of the fastening device, in particular of the securing ring, may preferably be selected greater than a theoretically resulting gap between the fastening device or the securing ring and the housing groove, in order to ensure freedom from play after assembly.

Moreover, the spring excursion of the at least one spring element which is covered when the bearing is being mounted in the housing is determined by the projecting length.

Preferably, there may also be provision for the spring collar of the at least one spring element and the push collar of the at least one push element to be connected to one another in one piece at least partially in the region of the turnover, particularly to above the first and/or the second bend radius.

The highest possible introduction of force and therefore a maximum deformation of the at least one spring element can thereby be achieved.

Furthermore, to improve the spring action of the fastening device, there may be provision for the spring collar of the at least one spring element to project radially further than the push collar of the at least one push element.

Moreover, the fastening device may be developed in such a way that the spring collar of the at least one spring element and the push collar of the at least one push element are separated from one another at least partially, in particular in the part in which the spring collar and the push collar project in each case axially beyond the basic body, by an essentially axial slot on the circumference of the fastening device.

Furthermore, there may be provision for the push collar to have in the axial direction an essentially V-shaped design, and/or for the fastening device to be made from sheet metal, in particular to be a securing/snap ring made from sheet metal.

In a particularly preferred design, it is provided that the at least one shoulder bears axially against the bearing ring, that the fastening device, in particular a securing ring, is continued in the hollow-cylindrical basic body axially away from the shoulder formed in one piece on the hollow-cylindrical basic body, that the hollow-cylindrical basic body merges axially into at least one portion, integrally formed in one piece and bent in a bead-like manner, of the fastening device, that the fastening device is bent at the portion radially outward and in the direction of the annular groove, and that the fastening device is continued at least from the portion into the at least one spring element integrally formed in one piece and the at least one push element integrally formed in one piece, in particular the at least one, particularly elastic spring element being spread outward away from the bearing ring further than the at least one push element, and/or the at least one spring element being spread outward away from the bearing ring into the annular groove.

In this case, there may be provision for the portion to be continued into a plurality of spring elements and push elements circumferentially adjacent to one another in each case and, in particular, separated essentially by axial slots, in particular the spring elements having in each case two adjacent push elements and/or a number of the spring elements and/or push elements being selected as a function of an (inside) diameter of the fastening device or of the securing ring.

In other words, depending on the size of the securing ring, that is to say the diameter of the securing ring and therefore a length of circumferential segments of the securing ring, a plurality of the push elements or push shackles may be provided, in order to minimize a deformation or flexion of the spring elements.

Furthermore, in order to improve the (axial) spring action of the fastening device, the fastening device may have essentially in the region of rounded transitions (radii and part of the hollow-cylindrical region of the basic body) smaller material thicknesses than in the remaining regions.

Furthermore, particularly preferably, there may be provision for the shoulder to be of disk-shaped design, and for the shoulder in the fastening device to be prestressed spring-elastically against the bearing ring axially.

Moreover, there may be provision for the bearing ring to bear axially against an axial stop fixed with respect to the housing, for the shoulder to bear axially against the bearing ring, and for the bearing ring to be elastically prestressed axially against the axial stop via the shoulder by means of the at least one spring element supported in the annular groove.

Furthermore, there may be provision that the fastening device, for example a securing ring, may have, on that side of the securing ring which faces away from the shoulder, at least one, but preferably more, bead-like reinforcements on the spring element and/or on the push element or near the spring element and/or the push element.

The securing ring is therefore highly rigid since the basic body is not weakened by cutting. The resistance of the fastening device against axial deformation is increased by means of the bead-like design if each individual spring element is reinforced in a bead-like manner by a plurality of existing spring elements.

Moreover, there may be provision for the fastening device, in this case a securing ring, to be produced preferably from sheet metal, and for the basic body to have preferably a hollow-cylindrical design, but also any other desired design. The shoulder is angled from the basic body radially inward at right angles or at any other desired angles to the basic body and bears at least partially against the bearing ring axially. The metal sheet is folded over radially outward from a prolongation of the basic body, so that the securing ring has the bead-like portion at the bending point. Depending on the design of the securing ring, the spring elements and the push shackles are integrated into the portion or are continued only from this, in the case of the spring elements, into the annular groove. It is therefore conceivable that the bead-like portion is not slotted as a collar and the fastening arrangement therefore to be extremely rigid. Alternatively, the slots extend through the portion as far as the basic body or axially into the basic body.

The metal sheet is folded over at least to an extent such that the spring elements are spread into the annular groove of the housing and engage at least into the annular groove. For this purpose, the spring elements preferably bear at least partially against an annular surface of the annular groove, which annular surface is inclined to the rotation axis of symmetry and preferably at an angle less than 90° to the hollow-cylindrical basic body.

In a further embodiment of the invention, the two flanks of the annular groove are formed in each case by an annular surface, which annular surfaces form between them an angle less than 90°. Under high axial loads acting on the bearing ring, the spring elements bear against both flanks and are thus optimally supported rigidly in the annular groove.

The shoulder is prestressed in the fastening arrangement preferably axially spring-elastically against the bearing ring. For this purpose, in the initial state before the assembly of the fastening arrangement, the shoulder is inclined at an acute angle to the hollow-cylindrically designed basic body. The basic body and the shoulder in this case between them, before the fastening arrangement is ready-assembled, form the acute angle on that side of the shoulder against which the end face of the bearing ring bears in the ready-assembled fastening arrangement. The bearing ring is thus elastically prestressed axially against the axial stop by means of the shoulder. Alternatively to this or simultaneously with this, the securing ring is supported, elastically prestressed, in the annular grove by means of the spring elements. In this case, the energy of the elastically sprung spring elements is transmitted to the shoulder and from the shoulder to the bearing ring supported on the axial stop. On account of the prestress in the fastening arrangement, the bearing ring is held in the fastening arrangement, preferably in any desired position which deviates from the desired position within permissible tolerance limits, so as to be elastically prestressed axially, free of play, by means of the securing ring.

DETAILED DESCRIPTION OF THE DRAWINGS

An exemplary embodiment of the invention is illustrated in figures and is explained in more detail.
In the figures.

DETAILED DESCRIPTION OF THE INVENTION

Figure 1:
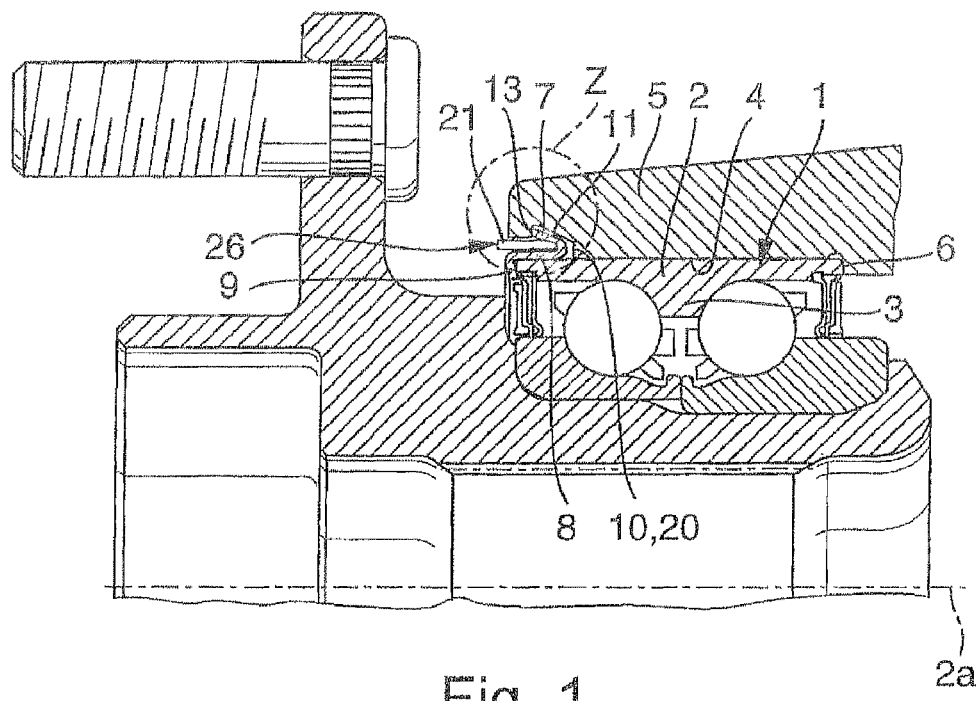
FIG. 1 shows a cross-sectional view of a fastening arrangement with a securing ring 7.

FIG. 1 shows a fastening arrangement 1 for a wheel bearing 3 in a longitudinal section along the rotational axis of symmetry 2a of a bearing ring 2 of the wheel bearing 3.

The wheel bearing 3 is a two-row sealed-off (angular ball) bearing. The bearing ring 2, an outer ring of the wheel bearing 3, is seated in a bore 4 of a housing 5 fixed on the vehicle side. An axial stop 6 in the form of a shoulder projects radially into the bore 4. The bearing ring 2 is supported on the axial stop 6 in one axial direction.

The bearing ring 2 is held axially in the other opposite axial direction by means of a securing ring 7. The securing ring 7 has circumferentially, distributed or divided in segments 22, essentially axially running spring elements 11 for the axial securing of the wheel bearing 3 and push shackles 21 for the axial prestressing of the spring elements 11.

Figure 2:
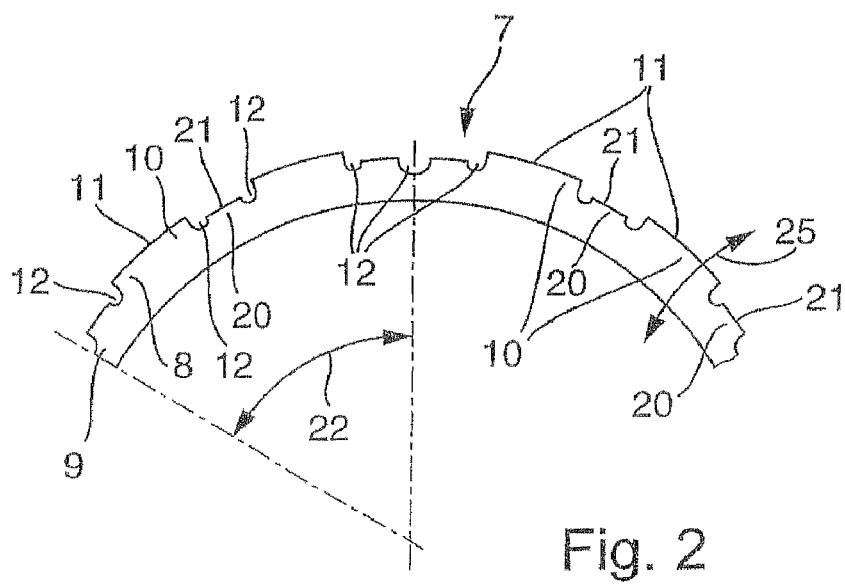
FIG. 2 shows a sectional view of the securing ring.
Figure 3:
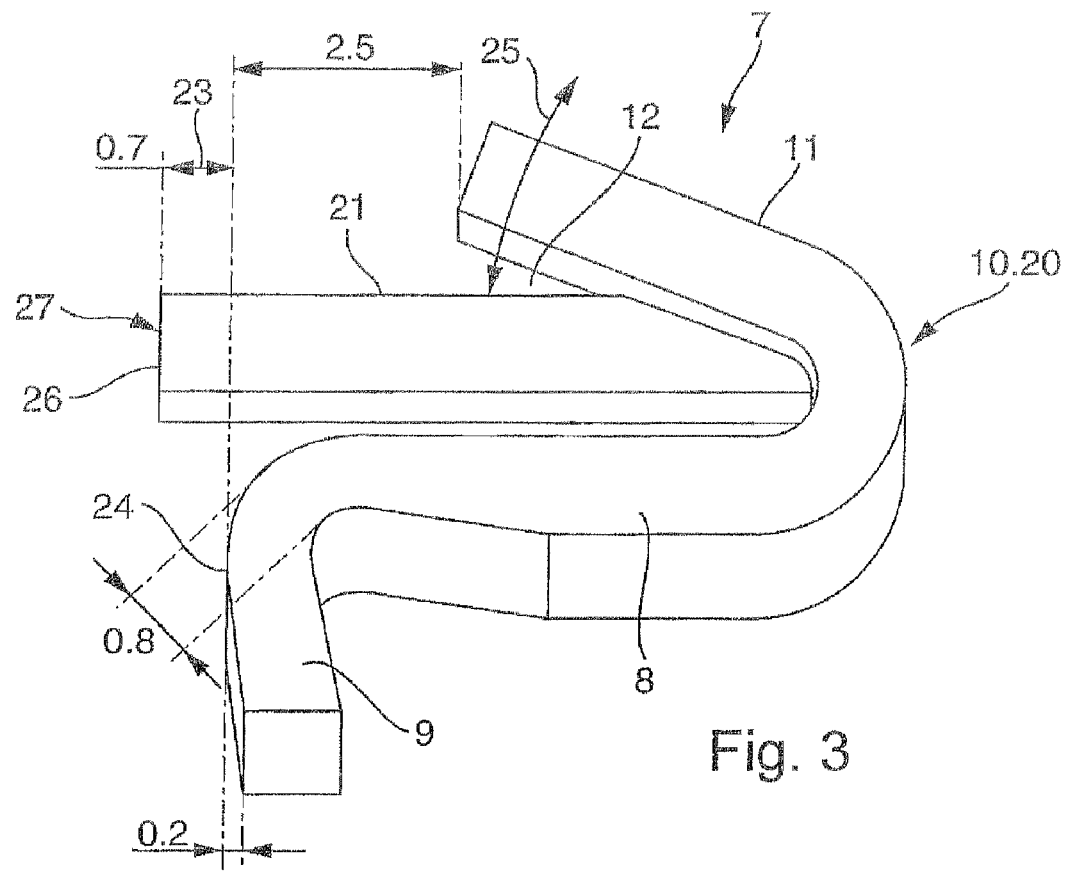
FIG. 3 shows a partial perspective view of the securing ring.
Figure 4:
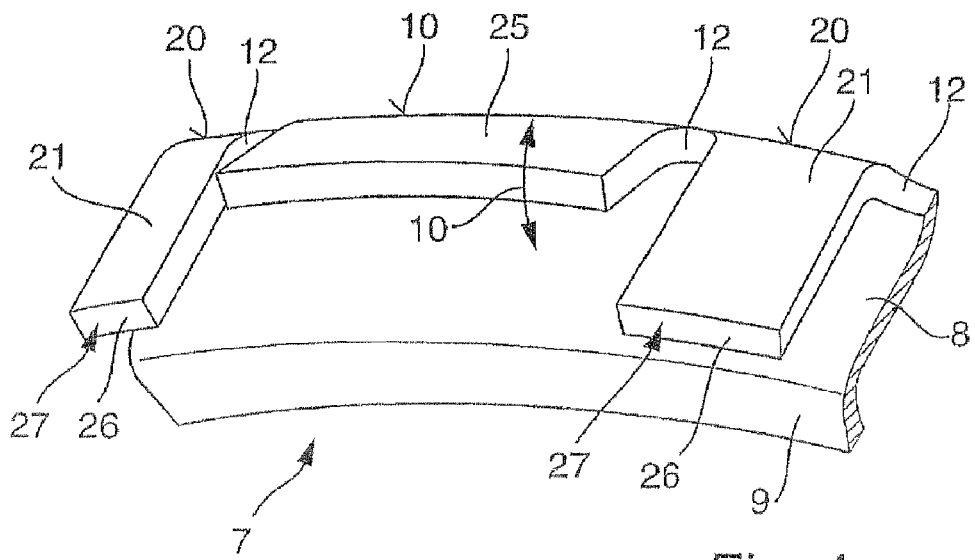
FIG. 4 shows an alternate partial perspective view of the securing ring.
Figure 5:
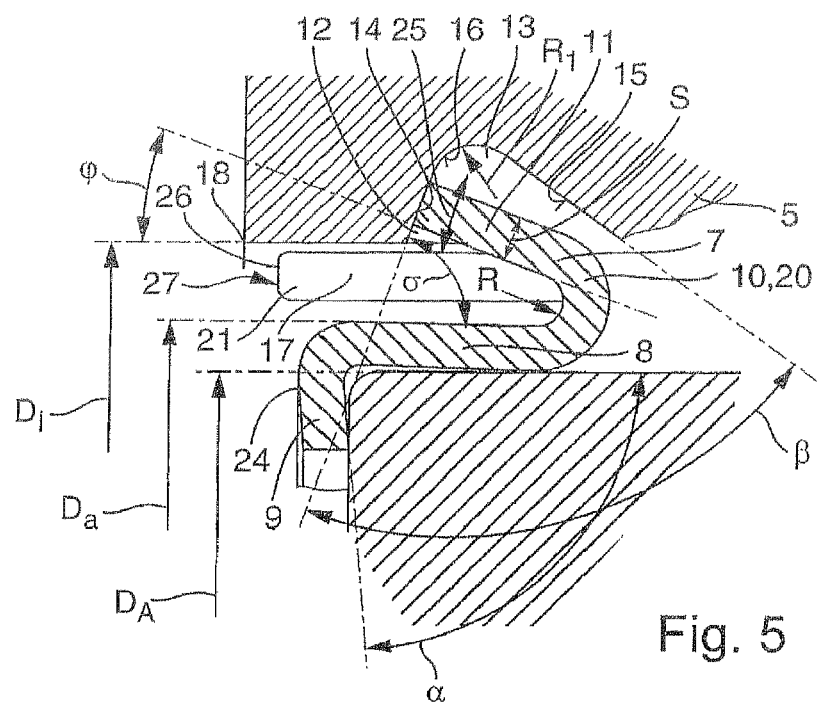
FIG. 5 shows detail Z of FIG. 1.
Figure 6:
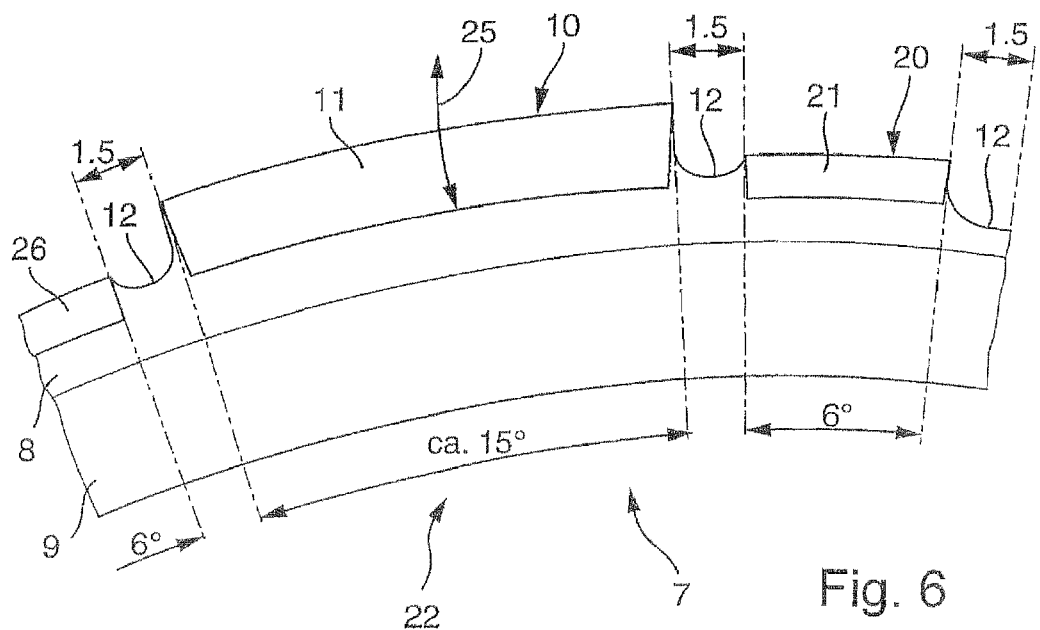
FIG. 6 shows a further sectional view of the securing ring.

FIG. 2 shows a detail, a segment 22 being identified here, of the securing ring 7 from the front. FIG. 3 shows the securing ring 7 in section. FIG. 4 shows a three-dimensional view of a detail of the securing ring 7. FIG. 5 illustrates the detail Z from FIG. 1, enlarged and not true to scale. FIG. 6 shows a detail of the securing ring 7 from the front.

The securing ring 7 is made from sheet metal and has a basic body 8. The shoulder 9, forming a cup spring, is angled radially inward from the basic body 8. The shoulder 9 is inclined at the angle $\alpha$ to the hollow-cylindrically configured basic body 8 (FIG. 5). The angle $\alpha$ is <90°, but may also be $\geq$90°.

The basic body 8 is continued, on an axial side pointing away from the shoulder 9, in a circumferentially continuous collar 10, 20 or portion 10, 20 of bead-like design.

On the portion 10 or 20, as is evident in particular from FIGS. 3 and 4, the securing ring 7 is continuously turned over circumferentially such that it in each case projects at least partially beyond the basic body 8 axially with the spring elements 11 formed thereby and with the push shackles 21 formed thereby.

By the turnover or in the region of the turnover, the spring elements 11 and the push shackles 21 are operatively connected or coupled to one another in such a way that, when an axial force is introduced 27 into the push shackles 21 or an axial force is applied to the push shackles 21, as, for example, when the wheel bearing 3 is pressed into the housing 5 (axial actuation 27), the spring elements 11 can be prestressed axially.

As illustrated, particularly in FIG. 3, the push shackles 21 project axially beyond the basic body 8 and beyond an axial end face of the securing ring 7 by the amount of a predetermineable projecting length 23 indicated in FIG. 3.

This projecting length 23 of the push shackles 21 determines the spring excursion 25 of the spring elements 11 which is covered when the wheel bearing 3 is mounted or pressed into the housing 5. By means of these push shackles 21 on the spring elements 11 or by means of these push shackles 21 coupled to the spring elements 11 via the common collar 10, 20, the spring elements 11 are prestressed axially during pressing (axial actuation 27) into the housing 5 and latch into an annular groove 13 provided for this purpose in the housing 5.

The collar 10, 20 continuous in the circumferential direction, divided into segments 22, has circumferentially, above the bend radius of the collar 10, 20, incipient or commencing (separating) slots 12. The slots 12 separate both spring elements 11 from push shackles 21 and push shackles 21 from push shackles 21 from one another circumferentially. As is evident particularly from FIG. 4, the slots 12 starting above the bend radius, between the spring elements 11 and push shackles 21, are continued in the collar 10 and axially beyond the basic body 8.

As illustrated further here in FIG. 2, such a segment 22 has two spring elements 11, each of which is framed by two adjacent push shackles 21, altogether three push shackles 21 per segment.

The spring elements 11 are bent over on the outside back from the basic body 8 in the manner of a hook such that, in the installed state, they are spread into the annular groove 13 of the housing 5 by the securing ring 7 at an angle $\phi$.

In this case, the spring elements 11 are bent on the inside with the radius R. $\phi$ is <45°, but may also be >45°, but may also be $\geq$45°.

The push shackles 21 are likewise bent over on the outside back from the basic body 8 in the manner of a hook, in this case the bend being designed in such a way that the push shackles 21 run approximately axially parallel beyond the basic body 8.

During the assembly of the fastening arrangement 1, using an assembly means or assembly tool, the securing ring 7 with a metal sheet made from spring steel is first placed onto the bearing ring 2 and pushed on or pressed on axially or, alternatively to this, is introduced into the annular gap 17 between the bearing ring 2 and the housing 5.

In the assembly tool, in contrast to hitherto conventional assembly tools, additional grooves with a depth of 0.2 mm are incorporated, into which, when the bearing 3 is pressed into the housing 5, the axial ends 26 of the push shackles 21 are received, with the result that the push shackles 21 are prevented from flapping off during the pressing-in operation.

In the axial forward or inward push, the spring elements 11 in this case impinge onto the edge 18 of the bore 4 and are sprung radially. The spring elements 11 can be sprung at most only until they come to bear radially against the basic body 8. The inside diameter $D_I$ is therefore greater than the sum of double the maximum sheet metal thickness S of the spring elements 11 and the outside diameter $D_a$ of the basic body 8 seated on the outside diameter $D_A$ of the bearing ring 2:

$$D_I > (2S + D_a)$$

By means of the push shackles 21, coupled to the spring elements 11, the latter are prestressed axially during pressing (axial actuation 27) into the housing 5 and, in the further forward or inward push, latch into the annular groove 13 provided for this purpose in the housing 5.

For this purpose, the annular groove 13 has two flanks facing one another in the form of the annular surfaces 14 and 15. The annular surface 14 points in the direction of the axial stop 6 and is inclined to the rotational axis of symmetry 2a. The annular surface 14 and the basic body 9 form an angle $\delta$ between them. $\delta$ is <90°, but may also be $\geq$90°.

The spring elements 11 bear with axial prestress against the annular surface 14. The annular surface 15 faces the annular surface 14 and the rotational axis of symmetry 2a. The annular surfaces 14 and 15 merge one into the other in a groove bottom 16 of the annular groove 13. The groove bottom 16 is rounded with the radius $R_1$. The annular surfaces 14 and 15 are inclined to one another at the angle $\beta$, which is less than 90°, but may also be $\geq$90°.

The shoulder 9 is prestressed spring-elastically against the bearing ring 2 and in this case can yield elastically axially at least until the angle $\alpha$, acute in the initial state, is at least 90° or greater than 90°. The shoulder 9 prestresses the bearing ring 2 axially against the axial stop 6. In this case, the shoulder 9 is supported, essentially free of play, axially in the opposite axial direction on the annular surface 14 via the spring elements 11.

It is conceivable that the spring elements 11 are elastically prestressed against the housing 5 in the annular groove 13. In this case, the elastic prestress is transmitted via the shoulder 9 to the bearing ring 2 and presses the latter axially against the axial stop 6.

FIG. 6 shows a sectional view of the securing ring 7 dividing the collar 10, 20 into segments 22. The spacing formed by the slots 12 between the collar 10, 20 and, thus, spring elements 11 and the push shackles 21 is 1.5 mm with the spacing correlating to an angle of approximately 15° for the spring elements 11 and 6° for the push shackle 21.

REFERENCE SYMBOLS

1 Fastening arrangement
2 Bearing ring
2a Rotational axis of symmetry
3 Wheel bearing
4 Bore
5 Housing
6 Axial stop
7 Securing ring
8 Basic body
9 Shoulder
10 Portion/collar
11 Spring element
12 Slot
13 Annular groove
14 Annular surface
15 Annular surface
16 Groove bottom
17 Annular gap
18 Edge
20 Portion/collar
21 Push shackle
22 Segment 23 Projecting length
24 End face
25 Spring excursion
26 Axial end
27 Axial actuation

The invention claimed is:

1. A fastening device, comprising:
a cylindrical basic body;
at least one spring element having at least one angled shoulder, the shoulder being angled in hook form from the basic body radially outward and at least partially back in an axial direction; and
at least one push element which is integrally formed on the fastening device and which is operatively connected to the at least one spring element in such a way that, by the at least one push element being actuated, the at least one spring element can be prestressed and braced axially,
wherein the at least one spring element is formed from at least one spring collar integrally in one piece on the basic body, the spring collar being overturned to form a first bend radius such that the spring collar projects at least partially beyond the basic body axially, and the at least one push element is formed from a push collar integrally formed in one piece on the basic body, the push collar being overturned to form a second bend radius, such that the push collar projects at least partially beyond the basic body axially, and
wherein the spring collar of the at least one spring element projects radially further than the push collar of the at least one push element.

2. The fastening device of claim 1, wherein the at least one push element is angled in hook form from the basic body radially outward and at least partially back into the axial direction, and during actuation of the at least one push element, the push element being capable of being loaded axially in an end region on an end face of a region angled axially back.

3. The fastening device of claim 2, wherein the at least one push element and the at least one spring element are operatively connected to one another.

4. The fastening device of claim 3, wherein in an event of axial load on the end region of the region angled axially back of the at least one push element, the region of the at least one spring element which is angled back at least partially into the axial direction can be spread radially away from the basic body.

5. The fastening device of claim 1, wherein the push collar of the at least one push element projects axially beyond the basic body by an amount of a predetermineable projecting length.

6. The fastening device of claim 1, wherein the spring collar of the at least one spring element and the push collar of the at least one push element are connected to one another in one piece at least partially in a region of a turnover to above a first and a second bend radius.

7. The fastening device of claim 1, wherein the spring collar of the at least one spring element and the push collar of the at least one push element are separated from one another at least partially, in a part in which the spring collar and the push collar project axially beyond the basic body, by an axial slot on a circumference of the fastening device.

8. The fastening device of claim 1, wherein the push collar has a V-shaped design in the axial direction and the fastening device is made from sheet metal.

9. The fastening device of claim 8, wherein the fastening device is a securing snap ring.

10. The fastening device of claim 1, wherein the at least one spring element and the at least one push element is a plurality of spring elements and push elements which are circumferentially adjacent to one another and separated by axial slots, the spring elements having in each case two adjacent push elements and a number of the spring elements and push elements being selected as a function of an diameter of the fastening device.

11. The fastening device of claim 1, wherein the fastening device has smaller material thickness in a region of rounded transitions than in remaining regions.

* * * * *